US010066884B2

(12) United States Patent
Guerra

(10) Patent No.: US 10,066,884 B2
(45) Date of Patent: Sep. 4, 2018

(54) METHOD AND APPARATUS FOR DAMPENING FLOW VARIATIONS AND PRESSURIZING CARBON DIOXIDE

(71) Applicant: Denbury Resources Inc., Plano, TX (US)

(72) Inventor: Peter D. Guerra, Dallas, TX (US)

(73) Assignee: Denbury Resources Inc., Plano, TX (US)

( * ) Notice: Subject to any disclaimer, the term of this patent is extended or adjusted under 35 U.S.C. 154(b) by 389 days.

(21) Appl. No.: 13/950,350

(22) Filed: Jul. 25, 2013

(65) Prior Publication Data

US 2015/0027682 A1 Jan. 29, 2015

(51) Int. Cl.

| | |
|---|---|
| ***G05D 16/00*** | (2006.01) |
| ***G05D 15/00*** | (2006.01) |
| ***G05D 23/00*** | (2006.01) |
| ***F28F 27/02*** | (2006.01) |
| ***F25J 1/00*** | (2006.01) |
| ***F25J 1/02*** | (2006.01) |
| *F25B 1/00* | (2006.01) |

(52) U.S. Cl.

CPC ............. *F28F 27/02* (2013.01); *F25J 1/0027* (2013.01); *F25J 1/0204* (2013.01); *F25J 1/0254* (2013.01); *F17C 2227/03* (2013.01); *F17C 2250/0408* (2013.01); *F17C 2250/0443* (2013.01); *F17C 2260/024* (2013.01); *F25B 1/00* (2013.01); *F25J 2235/04* (2013.01); *F25J 2235/80* (2013.01); *F25J 2260/80* (2013.01); *F25J 2290/34* (2013.01); *F25J 2290/62* (2013.01)

(58) Field of Classification Search

CPC .......... F17C 2227/03; F17C 2250/0408; F17C 2250/0443; F17C 2260/024

USPC .......................................... 165/281; 62/238.7

See application file for complete search history.

(56) References Cited

U.S. PATENT DOCUMENTS 3,191,395 A * 6/1965 Maher .................. F17C 13/025 62/47.1

3,661,483 A * 5/1972 Bose ...................... B29C 49/66 264/28

(Continued)

FOREIGN PATENT DOCUMENTS

CN 1898125 12/2003

CN 101137451 6/2004

(Continued)

OTHER PUBLICATIONS

SPE Paper 15916-PA; Title "Surface Processing of Carbon Dioxide in EOR Projects"; Aug. 1986; vol. 38, No. 8; Journal of Petroleum Technology.

(Continued)

*Primary Examiner* — Len Tran

*Assistant Examiner* — Paul Alvare

(74) *Attorney, Agent, or Firm* — Tumey L.L.P.

(57) ABSTRACT

An apparatus is provided for maintaining a steady flow rate and pressure of a carbon dioxide stream at high pressure when a low-pressure source of the carbon dioxide varies with time. Liquid level in an accumulator that is sized to accommodate variations in supply rate is controlled by sub-cooling of liquid entering the accumulator and heating in the accumulator, the sub-cooling and heating being controlled by a pressure controller operable in the accumulator.

6 Claims, 2 Drawing Sheets

(56) References Cited

U.S. PATENT DOCUMENTS

| | | | | | |
|---|---|---|---|---|---|
| 3,962,881 | A * | 6/1976 | Muska | F17C 9/04 | 62/121 |
| 4,249,915 | A | 2/1981 | Sircar et al. | | |
| 4,593,529 | A * | 6/1986 | Birochik | F17C 13/02 | 62/3.3 |
| 4,593,763 | A * | 6/1986 | Burke | E21B 36/001 | 166/302 |
| 4,726,815 | A | 2/1988 | Hashimoto et al. | | |
| 4,742,865 | A * | 5/1988 | Weitman | D06F 39/006 | 165/236 |
| 4,888,955 | A | 12/1989 | Tyree | | |
| 5,214,925 | A * | 6/1993 | Hoy | F04B 15/06 | 417/901 |
| 5,590,535 | A | 1/1997 | Rhoades | | |
| 6,516,626 | B2 | 2/2003 | Escobar et al. | | |
| 6,912,858 | B2 * | 7/2005 | White | F17C 3/08 | 62/50.5 |
| 7,654,320 | B2 | 2/2010 | Payton | | |
| 7,891,197 | B2 * | 2/2011 | Winter | F17C 5/02 | 62/50.1 |
| 8,163,070 | B2 | 4/2012 | Hees et al. | | |
| 2004/0035148 | A1 * | 2/2004 | Whitlock | C01B 21/20 | 62/617 |
| 2005/0126188 | A1 | 6/2005 | Winter | | |
| 2005/0268938 | A1 * | 12/2005 | Johnson | B08B 7/0021 | 134/2 |
| 2006/0010882 | A1 * | 1/2006 | Oldham | F17C 13/025 | 62/50.1 |
| 2007/0051114 | A1 * | 3/2007 | Mahlanen | B63J 99/00 | 62/50.1 |
| 2010/0077752 | A1 | 4/2010 | Papile | | |
| 2011/0100040 | A1 | 5/2011 | Bush et al. | | |
| 2011/0252828 | A1 | 10/2011 | Lockwood et al. | | |
| 2013/0025317 | A1 | 1/2013 | Terrien et al. | | |
| 2013/0047664 | A1 | 2/2013 | DiCenzo et al. | | |

FOREIGN PATENT DOCUMENTS

| | | |
|---|---|---|
| WO | 2005/058684 | 6/2005 |
| WO | WO2007117974 | 10/2007 |

OTHER PUBLICATIONS

SPE Paper 21766-PA; Title "Control of Waste Gas from a Thermal EOR Operation"; Jun. 1991; vol. 43, No. 6; Journal of Petroleum Technology.

SPE Paper 23564-PA; Title "Carbon Dioxide Flooding"; Apr. 1992; vol. 44, No. 4; Journal of Petroleum Technology.

SPE Paper 22022-PA; Title "An Approach to Optimize Economics in a West Texas CO2 Flood"; vol. 44, No. 9; Journal of Petroleum Technology.

Patent Cooperation Treaty, International Search Report and Written Opinion, dated Nov. 14, 2014; pp. 1-7.

Chinese office action and translation for Chinese application No. 201480052413.2 dated Dec. 27, 2016.

2nd Chinese Office Action and English Translation for Application No. 201480052413.2 dated Oct. 16, 2017.

* cited by examiner

METHOD AND APPARATUS FOR DAMPENING FLOW VARIATIONS AND PRESSURIZING CARBON DIOXIDE

BACKGROUND OF INVENTION

1. Field of the Invention

This invention relates to surface apparatus for processing carbon dioxide ($CO2$) to be injected into wells for enhanced recovery of crude oil. More particularly, apparatus and method are provided for decreasing flow rate variations (i.e., flow dampening) and supplying high-density carbon dioxide to a well at higher energy efficiency when carbon dioxide gas is sourced from a variable rate or intermittent source.

2. Description of Related Art

Injection of carbon dioxide into an oil reservoir to increase the recovery of crude oil from the oil reservoir is a proven technology. It has been practiced for more than 40 years. Carbon dioxide gas is injected into some wells, flows through rock containing crude oil, and is produced from other wells, along with oil and often a large volume of water. Variations of the process include injection of slugs of water with the carbon dioxide to improve sweep efficiency of the carbon dioxide. In some oil reservoirs, additional recovery of oil is primarily the result of the high solubility of carbon dioxide in the oil, which expands the oil phase and decreases the amount of oil left trapped in the rock. Carbon dioxide's effect in lowering the viscosity of crude oil is important in improving oil recovery from some reservoirs. Under other conditions a displacement zone between the crude oil and carbon dioxide may become miscible with the oil and carbon dioxide.

The sources of carbon dioxide currently used for flooding of oil reservoirs are reservoirs containing high purity carbon dioxide and anthropogenic carbon dioxide. Anthropogenic carbon dioxide may be recovered from industrial plants or from power sources. Recently it was announced that carbon dioxide will be recovered from a refinery and used for injection into wells (Dallas Bus. J., May 10, 2013). Recovery of carbon dioxide from a nitrogen plant and planned recovery from an industrial plant are reported in the same source.

Recovery of carbon dioxide from the atmosphere offers an almost limitless supply for injection underground, but the concentration of carbon dioxide in the atmosphere is low compared with industrial sources. Nevertheless, new processes using the atmosphere, engine exhaust, flue gas or other sources of carbon dioxide are being developed. One such process is described in U.S. Pat. App. Pub. No. 2013/0047664, which discloses removal of carbon dioxide from the atmosphere by a combination of drying with a desiccant, adsorption of carbon dioxide from the dry air, releasing the carbon dioxide from the adsorbent by decreasing pressure to a vacuum and solidifying the carbon dioxide on a cold surface in a vacuum chamber. U.S. Pat. App. Pub, No. 2013/0025317 discloses a process for removing carbon dioxide from a gas stream by de-sublimation, vaporization and liquefaction. U.S. Pat. App. Pub. No. 2011/0252828 discloses a carbon dioxide recovery method using cryo-condensation. U.S. Pat. App. Pub. No. 2013/0025317 discloses an auto-refrigerated process for de-sublimation of a flue gas. Of course, carbon dioxide may be separated from other gases by well-known cryogenic processes (liquefaction, distillation), but they are expensive and not practical as a stand-alone recovery process for carbon dioxide from gases containing low concentrations of carbon dioxide.

The output of carbon dioxide from some of the processes disclosed above and other possible processes varies with time. Output pressure may be low and output rate may be intermittent, as from a batch process, or not at a steady rate, as from any carbon dioxide recovery process that requires regeneration. For use in enhanced oil recovery (EOR) carbon dioxide gas is injected for months or years at pressures usually in the range from 1200 psi to 3000 psi, requiring high compression ratios from a low-pressure source. A steady rate is needed, because conventional methods of pressurization are negatively affected by problems associated with intermittent flow.

Equipment and methods are needed for providing a more energy-efficient method for pressurizing $CO2$ and providing the fluid at a steady rate from processes that supply carbon dioxide at a varying rate.

BRIEF SUMMARY OF THE INVENTION

Carbon dioxide ($CO2$) gas from a source at or above the triple-point pressure is cooled by a heat pump to a sub-cooled liquid and sprayed into a surge vessel or accumulator containing two phases. The amount of heat added in a heating coil in the lower part of the accumulator and the temperature of the sub-cooled liquid are controlled by a pressure controller in the accumulator, such that the level of the dense phase in the accumulator moves between two levels (forming an "accumulator volume"), while pressure in the vessel is maintained near constant as dense $CO2$ is pumped out of the bottom of the accumulator at a constant rate and input rate of $CO2$ from the source varies with time. The accumulator volume in the accumulator is sized to account for variations in output rate of the particular source. A carbon dioxide pump, with speed controlled by the average flow rate from the source, is used to pump the more dense $CO2$ phase in the bottom of the accumulator to the pressure needed for injection into wells for enhanced oil recovery or into a pipeline (often in the range from 1200 psi to 3000 psi) or for other uses. Additional cooling may be used immediately upstream of the pump to insure adequate suction pressure and prevent cavitation in the pump. The heat pump process for the two-phase vessel may use a conventional heat pump with propane or other fluids or mixtures of heat pump fluid selected for maximum efficiency.

DETAILED DESCRIPTION OF THE INVENTION

Figure 1:
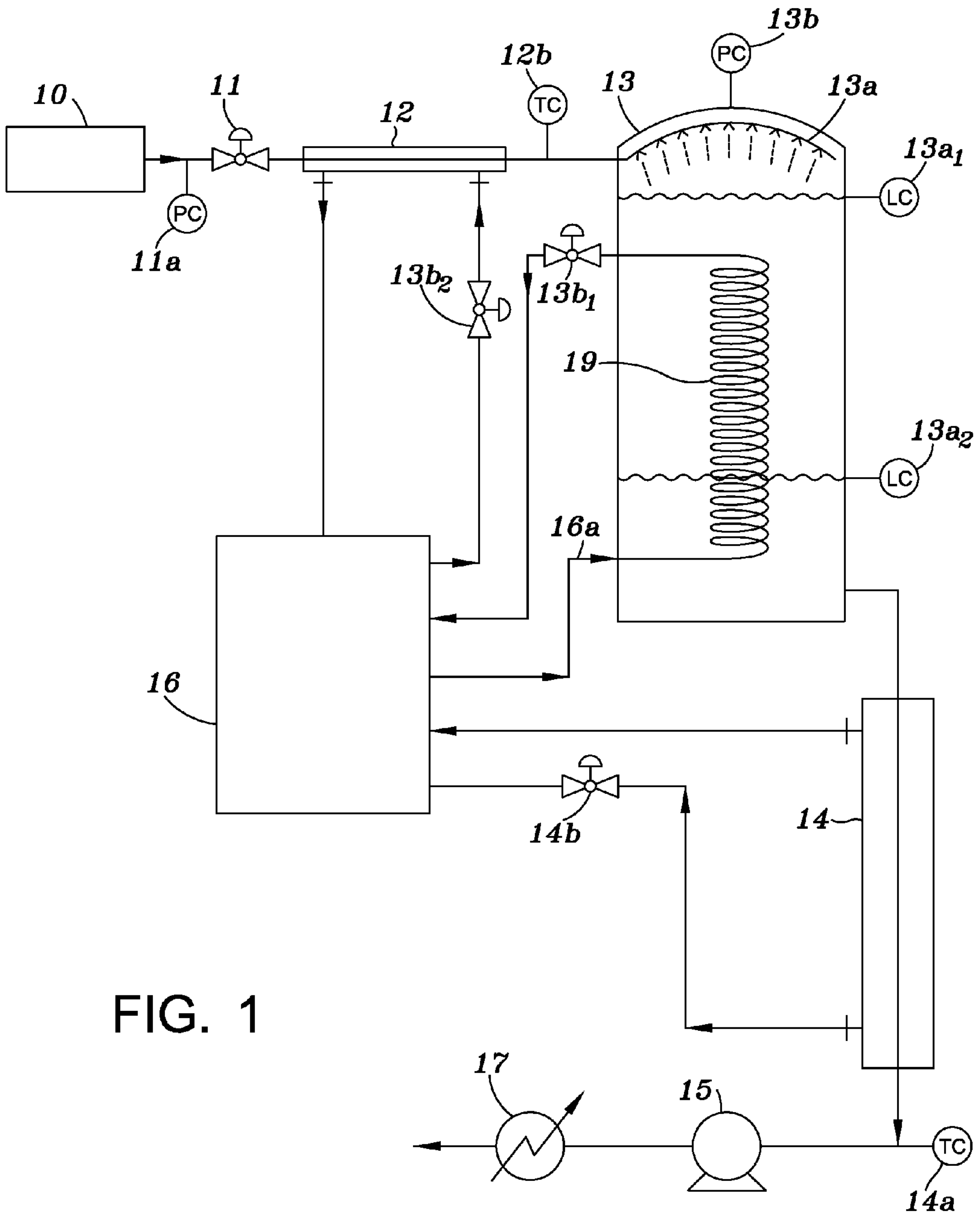
FIG. 1 illustrates one embodiment of apparatus used to decrease variations of flow rate of carbon dioxide supplied for pumping to high pressure for injection into wells, a pipeline or other uses.

Referring to FIG. 1, variable-rate or intermittent carbon dioxide source 10 uses a batch process, regeneration process or other process that results in varying output rates of carbon dioxide. Source 10 may be based on adsorption-desorption, de-sublimation-sublimation, or other processes. The pressure of $CO_2$ from source 10 is greater than, or is compressed to be equal to or greater than, the triple point pressure (75.12 psia). Preferably, the pressure is less than the critical pressure, but the pressure may be as high as about 2000 psi. Intermittent flow isolation device 11 may be used to prevent backflow to source 10. This device may be a throttle, check or snap acting valve or it may be controlled by pressure controller 11*a*. The $CO_2$ may be any in any combination of phases (solid, liquid and gas). Heat exchanger 12 may be a shell and tube, counter-flow or any type heat exchange device. The $CO_2$ may be cooled or heated (depending on the phases of $CO_2$ from source 10) in heat exchanger 12 to liquefy $CO_2$ or densify any supercritical $CO_2$ and sub-cool the liquid, using external heat pump 16. The heat pump may include a compressor and condenser and may use a refrigerant selected to optimize the vaporization and liquefaction of $CO_2$ at any application-specific pressure. The refrigerant supply is controlled by temperature control valve 13*b*2. Alternatively, the heat pump may include heat sinks and heat sources from outside processes, such as adsorption and desorption separation of $CO_2$ to supply source 10. The outside processes may be synchronized to accommodate the need for alternating heat flux in the disclosed apparatus. Alternatively, a heat storage device may be used to provide a thermal capacitance suitable for specific application alternating heat flux requirements.

Sub-cooled liquid (below saturation temperature) from heat exchanger 12 passes to accumulator 13, where it flows (preferably as a spray through mister system 13*a*) into the vapor space. The level of heavier phase carbon dioxide may vary between 13*a*1 and 13*a*2, which define the bottom and top of the accumulator volume in accumulator 13. Accumulator volume is selected to accommodate the variations in output rate of source 10. Level controls 13*a*1 and 13*a*2 may be used to shut-down an upset condition and/or to adjust to more gradual changes to average flow of source 10. Level controls 13*a*1 and 13*a*2, pressure controller 13*b*, coil 19 and sub-cooled liquid flowing into accumulator 13 are used to maintain the liquid level between level controls 13*a*1 and 13*a*2. Pressure controller 13*b*, which may work in conjunction with temperature controller 12*b*, controls heat flux of sub-cooled liquid by valve 13*b*2 and heat flux through coil 19 by valve 13*b*1. Heat medium fluid or refrigerant enters coil 19 at 16*a*. The heat flux may be supplied from heat pump 16 or another source, such as a $CO_2$ recovery process using adsorption and desorption (not shown). Pressure controller 13*b* throttles valve 13*b*2 such that sub-cooled fluid flowing through mister system 13*a* cools the vapor in 13, liquefying enough vapor to offset the volume of net positive influx of liquid into accumulator 13. Pressure controller 13*b* throttles heat flow into the saturated liquid section of accumulator 13 to vaporize sufficient liquid to offset the net negative liquid influx. If there is a net positive flow of $CO_2$ into accumulator 13, pressure is maintained in accumulator 13 by cooling vapor to liquefy a portion of the vapor to offset the reduction of the vapor space volume (rising liquid level). If there is a net negative flow of $CO_2$ into accumulator 13, pressure is maintained by heating the saturated liquid section such that sufficient liquid is vaporized to offset the increase in vapor space volume (falling liquid level).

Pump 15 may be a conventional pump, such as a multi-stage centrifugal pump. It may be used to pump liquid $CO_2$ to a pipeline or well or other use. The $CO_2$ may be further densified at heat exchanger 14, which may use refrigerant from heat pump 16, ambient air or other means, to increase the Net Positive Suction Head to prevent cavitation or increase efficiency of pump 15. Temperature control is provided at valve 14*b*, controlled by temperature controller 14*a*. Further cooling may be provided at heat exchanger 17 to increase the efficiency of a downstream pipeline or injection well. Equipment may be industry-standard. One of the important features of the apparatus described herein is the ability to pump dense or liquid carbon dioxide from the apparatus at a steady rate and without the inefficiency and high cost of compression of gas while avoiding problems of control and wear caused by cycling of the $CO_2$ pump.

Figure 2:
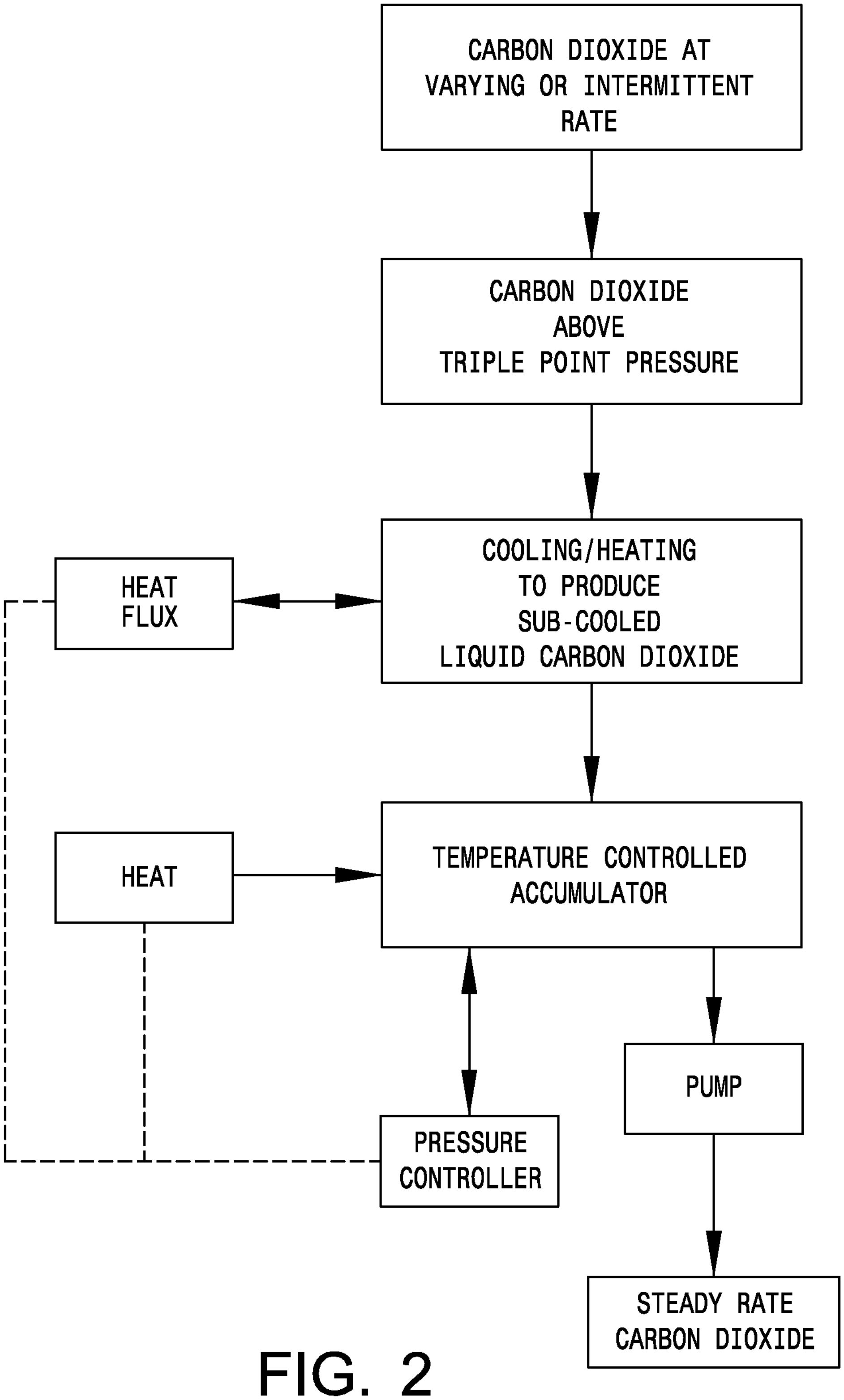
FIG. 2 shows a flow chart of the disclosed method for maintaining a steady stream of carbon dioxide from a source having variations in flow rate.

Referring to FIG. 2, the steps of the method for supplying carbon dioxide at a steady rate from a source producing carbon dioxide at a varying or intermittent rate are shown. An intermittent or varying rate source of carbon dioxide at a pressure at or above its triple-point pressure is supplied. If the source originally does not produce $CO_2$ at a pressure at or above the triple-point pressure, the $CO_2$ pressure is increased to that pressure. The stream is then cooled or heated to a temperature sufficient to produce sub-cooled liquid carbon dioxide. The stream is then conveyed to an accumulator, where the temperature of the sub-cooled carbon dioxide is controlled by a pressure controller responsive to pressure in the accumulator. Heat flux may also be supplied to the accumulator by a fluid flowing through a conduit or coil in the accumulator at a rate controlled by the pressure controller responsive to pressure in the accumulator. A conduit may be any type of heat transfer device, including electric heaters and other conventional devices, with appropriate controls for the heat transfer device. A pump removes the dense or liquid carbon dioxide from the accumulator at a steady rate determined by the average flow rate of the stream entering the accumulator.

Although the present invention has been described with respect to specific details, it is not intended that such details should be regarded as limitations on the scope of the invention, except to the extent that they are included in the accompanying claims.

What is claimed is:

1. Flow-connected apparatus for decreasing fluctuations in rate of flow of a stream of carbon dioxide, wherein a pressure of the stream of carbon dioxide is at or above a triple point pressure, wherein the stream of carbon dioxide is from an intermittent or variable rate source of carbon dioxide, comprising:

- a first heat exchanger configured to subcool the stream of carbon dioxide;
- a flow isolation device configured to prevent a backflow of carbon dioxide to the source of carbon dioxide;
- an accumulator connected to the first heat exchanger, wherein the accumulator contains a vapor phase and a liquid phase of carbon dioxide;
- a mister system coupled to the first heat exchanger wherein the mister system is located inside the accumulator, and wherein the mister system is configured to provide sub cooled carbon dioxide to a vapor space in the accumulator;
- a heat source for supplying heat flux in the first heat exchanger and the accumulator, a pressure controller configured to maintain a set pressure in the accumulator by regulating a valve, wherein the valve regulates heat flux into the accumulator such that a portion of the liquid phase carbon dioxide vaporizes when there is a net negative flow of carbon dioxide into the accumulator and regulating heat flux into the first heat exchanger such that a portion of the carbon dioxide is liquefied when there is a net positive flow of carbon dioxide into the accumulator, wherein the net negative flow of the carbon dioxide is indicated by the volume of the liquid phase inside the accumulator falling, wherein the net positive flow of the carbon dioxide is indicated by the volume of the liquid phase inside the accumulator rising;

upper and lower liquid level controls in the accumulator, for determining an accumulator volume in the accumulator between the liquid level controls, the accumulator volume selected to accommodate predicted variations of output rate from the source of carbon dioxide;

a conduit for carrying heated fluid, the conduit disposed between or below the liquid level controls in the accumulator, flow through the conduit being controlled by the pressure controller responsive to pressure in the accumulator;

a pump connected to the accumulator for pumping liquid carbon dioxide, wherein the pump removes carbon dioxide from the apparatus and is connected to a pipeline or well, wherein a speed of the pump is controlled by an average flow rate from the source of carbon dioxide, and a second heat exchanger connected in between the accumulator and pump wherein the second heat exchanger is configured to densify the liquid.

2. The apparatus of claim 1 wherein the heat source is a heat pump containing a refrigerant.

3. The apparatus of claim 1 wherein the heat source is provided by an outside process.

4. The apparatus of claim 2 wherein the refrigerant is capable of carbon dioxide liquefaction at the pressure of the source of carbon dioxide.

5. The apparatus of claim 1 further comprising an additional heat exchanger and refrigeration downstream of the pump.

6. The apparatus of claim 1 wherein the flow isolation device comprises a throttle, a check valve, a snap acting valve, or a combination thereof.

* * * * *